United States Patent
Frankel

(10) Patent No.: US 11,451,494 B2
(45) Date of Patent: Sep. 20, 2022

(54) PACKET ORDER RECOVERY IN A PROGRAMMABLE EDGE SWITCH IN A DATA CENTER NETWORK

(71) Applicant: Ciena Corporation, Hanover, MD (US)

(72) Inventor: Michael Y. Frankel, Bethesda, MD (US)

(73) Assignee: Ciena Corporation, Hanover, MD (US)

( * ) Notice: Subject to any disclaimer, the term of this patent is extended or adjusted under 35 U.S.C. 154(b) by 50 days.

(21) Appl. No.: 16/565,541

(22) Filed: Sep. 10, 2019

(65) Prior Publication Data

US 2021/0075746 A1    Mar. 11, 2021

(51) Int. Cl.
| | |
|---|---|
| *H04L 49/9057* | (2022.01) |
| *H04L 47/32* | (2022.01) |
| *H04L 47/34* | (2022.01) |
| *H04L 47/625* | (2022.01) |
| *H04L 49/90* | (2022.01) |

(52) U.S. Cl.
CPC .......... *H04L 49/9057* (2013.01); *H04L 47/32* (2013.01); *H04L 47/34* (2013.01); *H04L 47/627* (2013.01); *H04L 49/9068* (2013.01)

(58) Field of Classification Search
CPC ... H04L 49/9057; H04L 47/627; H04L 47/34; H04L 47/32; H04L 49/9068
See application file for complete search history.

(56) References Cited

U.S. PATENT DOCUMENTS

| | | | |
|---|---|---|---|
| 9,551,836 B2 | 1/2017 | Frankel et al. | |
| 10,141,926 B2 | 11/2018 | Frankel et al. | |
| 10,200,305 B2 | 2/2019 | Frankel et al. | |
| 10,212,496 B2 | 2/2019 | Frankel et al. | |
| 2004/0049596 A1* | 3/2004 | Schuehler | H04L 69/16 709/231 |
| 2016/0127227 A1* | 5/2016 | Lee | H04L 49/10 370/389 |
| 2016/0234168 A1* | 8/2016 | Leung | H04L 63/0254 |
| 2016/0301593 A1 | 10/2016 | Blair et al. | |
| 2018/0026856 A1* | 1/2018 | Yang | H04L 41/5019 709/224 |
| 2018/0241696 A1* | 8/2018 | Sindhu | H04L 49/70 |
| 2019/0044878 A1 | 2/2019 | Steffen et al. | |

(Continued)

OTHER PUBLICATIONS

S. Ghorbani et al., DRILL: Micro Load Balancing for Low-latency Data Center Networks, SIGCOMM '17, Aug. 21-25, 2017, pp. 1-14.

(Continued)

*Primary Examiner* — Omer S Mian

(74) *Attorney, Agent, or Firm* — Clements Bernard Baratta; Lawrence A. Baratta, Jr.; Christopher L. Bernard

(57) ABSTRACT

Systems and methods include receiving incoming packets associated with flows in a data center network where the flows are forwarded on a per-packet basis; maintaining a state of each of the flows and of received incoming packets; and dequeuing the received incoming packets based on one or more packet dequeue conditions and the state. The edge switch can be one of a Top of Rack switch and a Network Interface Card (NIC) communicatively coupled to a corresponding server. The received incoming packets can utilize a transport protocol including any of Transmission Control Protocol (TCP), Xpress Transport Protocol (XTP), and Stream Control Transmission Protocol (SCTP).

20 Claims, 8 Drawing Sheets

(56) References Cited

U.S. PATENT DOCUMENTS

| | | |
|---|---|---|
| 2019/0052567 A1 | 2/2019 | Muntz |
| 2019/0158939 A1 | 5/2019 | Frankel et al. |
| 2019/0182180 A1 | 6/2019 | Frankel et al. |

OTHER PUBLICATIONS

Y. Geng et al., JJUGGLER: A Practical Reordering Resilient Network Stack for Datacenters, EuroSys '16, Apr. 18-21, 2016, pp. 1-16.

P4 16 Portable Switch Architecture (PSA), Version 1.1, The P4.org Architecture Working Group, Nov. 22, 2018, pp. 1-61.

Dec. 4, 2020, International Search Report and Written Opinion for International Application No. PCT/US2020/049840.

* cited by examiner

11,451,494 B2

PACKET ORDER RECOVERY IN A PROGRAMMABLE EDGE SWITCH IN A DATA CENTER NETWORK

FIELD OF THE DISCLOSURE

The present disclosure generally relates to networking. More particularly, the present disclosure relates to systems and methods for packet order recovery in a programmable edge switch in a data center network.

BACKGROUND OF THE DISCLOSURE

Data Centers (DC) and High-Performance Computing (HPC) clusters are critical in computing infrastructure and continually growing in scale and size. Their scale ranges anywhere from a few compute and storage servers linked through an Ethernet switch, to Mega Data Centers with 100's of thousands of servers hosted in warehouses the size of several football fields, and consuming ~100 MW of power, with a significant network for interconnection. The cost of building and equipping a large DC can easily exceed $1B, with the majority of the cost being spent on compute and storage servers. Similarly, power consumption is rapidly becoming a limiting factor in DC operation economics. DC equipment cost and operating power are predominantly in compute infrastructure (Central Processing Unit (CPU) and Storage) (~70%), and ~20% is in networking equipment. However, as compute capabilities and required bandwidth is increasing, networking requirements are increasing super-linearly. This super-linear scaling of switches and optical links is caused by the inability of switching Application Specific Integrated Circuit (ASIC) I/O port counts to keep up with the data center bandwidth growth. Data center internal traffic is growing significantly faster than switch chip capacity and outstrips interface rates. FIG. 1 illustrates a graph of the capacity and expected growth over time for data center traffic 2 (~70% annual growth), switch chip capacity 4 (~40% annual growth), and per-lane interface rates 6 (~20% annual growth) for switch chips. FIG. 1 illustrates a concern that the networking layer in data center networks is not equipped to handle the growth in data center traffic 2. Also, it should also be noted that this DC internal traffic growth rate is much larger than external Wide Area Network (WAN) network growth.

This mismatch in growth rates is expected to be exacerbated going forward, such as due to 5G wireless network, proliferation of Internet of Things (IoT) devices, edge cached content with massive replication, etc. As such, there is a need for a networking layer with much higher throughput to address the ever-increasing needs of data center networks.

BRIEF SUMMARY OF THE DISCLOSURE

In an embodiment, an edge switch includes circuitry configured to receive incoming packets associated with flows in a data center network where the flows are forwarded on a per-packet basis; circuitry configured to maintain a state of each of the flows and of received incoming packets; and circuitry configured to dequeue the received incoming packets based on one or more packet dequeue conditions and the state. The circuitry configured to receive incoming packets can be configured to queue the received incoming packets, and the circuitry configured to maintain the state can be configured to maintain an entry for each of the received incoming packets based on a flow identifier and a sequence number. The edge switch can further include circuitry configured to process headers of the received incoming packets in the queue, for the circuitry configured to dequeue the received incoming packets. The state can be managed in memory in the edge switch, and the edge switch can further include circuitry configured to delete entries in the memory that are stale and that are dequeued.

The one or more packet dequeue conditions can include any of a packet satisfying a next expected sequence number, a packet having a much smaller sequence number than expected indicative of a retransmitted packet, memory storing the state is overfilled for a particular flow, and an entry for the state is stale. The edge switch can be one of a Top of Rack switch and a Network Interface Card (NIC) communicatively coupled to a corresponding server. The received incoming packets can utilize a transport protocol including any of Transmission Control Protocol (TCP), Xpress Transport Protocol (XTP), and Stream Control Transmission Protocol (SCTP). For a particular flow, a first packet can take a different path in the data center network than a second packet such that the second packet is received out-of-order at the edge switch.

In another embodiment, a method includes receiving incoming packets associated with flows in a data center network where the flows are forwarded on a per-packet basis; maintaining a state of each of the flows and of received incoming packets; and dequeuing the received incoming packets based on one or more packet dequeue conditions and the state. The receiving incoming packets can include queueing the received incoming packets, and the maintaining can include maintaining an entry for each of the received incoming packets based on a flow identifier and a sequence number. The method can further include processing headers of the received incoming packets in the queue, for the dequeuing. The state can be managed in memory in the edge switch, and the method can further include deleting entries in the memory that are stale and for packets that are dequeued.

The one or more packet dequeue conditions can include any of a packet satisfying a next expected sequence number, a packet having a much smaller sequence number than expected indicative of a retransmitted packet, memory storing the state is overfilled for a particular flow, and an entry for the state is stale. The method can be implemented in an edge switch that is one of a Top of Rack switch and a Network Interface Card (NIC) communicatively coupled to a corresponding server. The received incoming packets can utilize a transport protocol including any of Transmission Control Protocol (TCP), Xpress Transport Protocol (XTP), and Stream Control Transmission Protocol (SCTP). For a particular flow, a first packet can take a different path in the data center network than a second packet such that the second packet is received out-of-order at the edge switch.

In a further embodiment, a data center network includes a plurality of switches communicatively coupled to a plurality of servers, wherein packets associated with flows in the data center network are forwarded on a per-packet basis, and wherein each of the plurality of switches is configured to maintain a state of each of the flows and of received incoming packets, and dequeue the received incoming packets based on one or more packet dequeue conditions and the state. The one or more packet dequeue conditions can include any of a packet satisfying a next expected sequence number, a packet having a much smaller sequence number than expected indicative of a retransmitted packet, memory storing the state is overfilled for a particular flow, and an entry for the state is stale. The plurality of switches can be one of a Top of Rack switch and a Network Interface Card (NIC) communicatively coupled to a corresponding server. The received incoming packets can utilize a transport protocol including any of Transmission Control Protocol (TCP), Xpress Transport Protocol (XTP), and Stream Control Transmission Protocol (SCTP).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for packet order recovery in a programmable edge switch in a data center network. The present disclosure addresses the networking layer in a data center network specifically to increase throughput efficiency, decrease both average and tail flow completion latency, and maintain full compatibility with existing server protocols, i.e., Transmission Control Protocol (TCP), Xpress Transport Protocol (XTP), Stream Control Transmission Protocol (SCTP), etc. The present disclosure allows packets in a flow to take different paths in a data center network, which includes packets possibly arriving out-of-order, and with packet reordering. This is referred to as per-packet forwarding versus traditional flow-based forwarding where all packets in a flow take the same path (which obviates the need for packet order recovery). The packet order recovery is performed at a network edge switch, before being sent to a server. The network edge switch can include an edge switch such as a Top of Rack (TOR) switch but can include Network Interface Card (NIC) hardware, in a server, if it includes a switch or Field Programmable Gate Array (FPGA). The present disclosure includes maintenance of flow and packet state, order recovery as needed, recirculation of headers for repeated processing inside the switch, controlling the extent of the stored state through a set of timers and entry counters, and the like. Again, the present disclosure preserves applicability across multiple transport protocols, such as TCP, XTP, SCTP, etc.

The present disclosure leverages the programmability of a new range of data center switching circuitry (e.g., Application Specific Integrated Circuits), such as Broadcom Trident 3/4, Barefoot Tofino, Marvell Falcon, etc. These programmable ASICs enable novel functions to be developed and programmed into the switch. As is described herein, per-packet forwarding can achieve much better throughput and much lower flow completion latency, compared to more traditional flow-based forwarding. However, per-packet forwarding introduces some amount of TCP flow packet reordering, which causes problems at the TCP layer (or the like), potentially reducing flow throughput, inducing false packet retransmits, etc. Restoring proper flow order at the network edge allows simultaneous performance gain and compatibility with existing transport protocols (i.e., TCP, XTP, SCTP, etc.). That is, the per-packet forwarding provides the aforementioned advantages without the disadvantages.

Data Center Network

Figure 1:
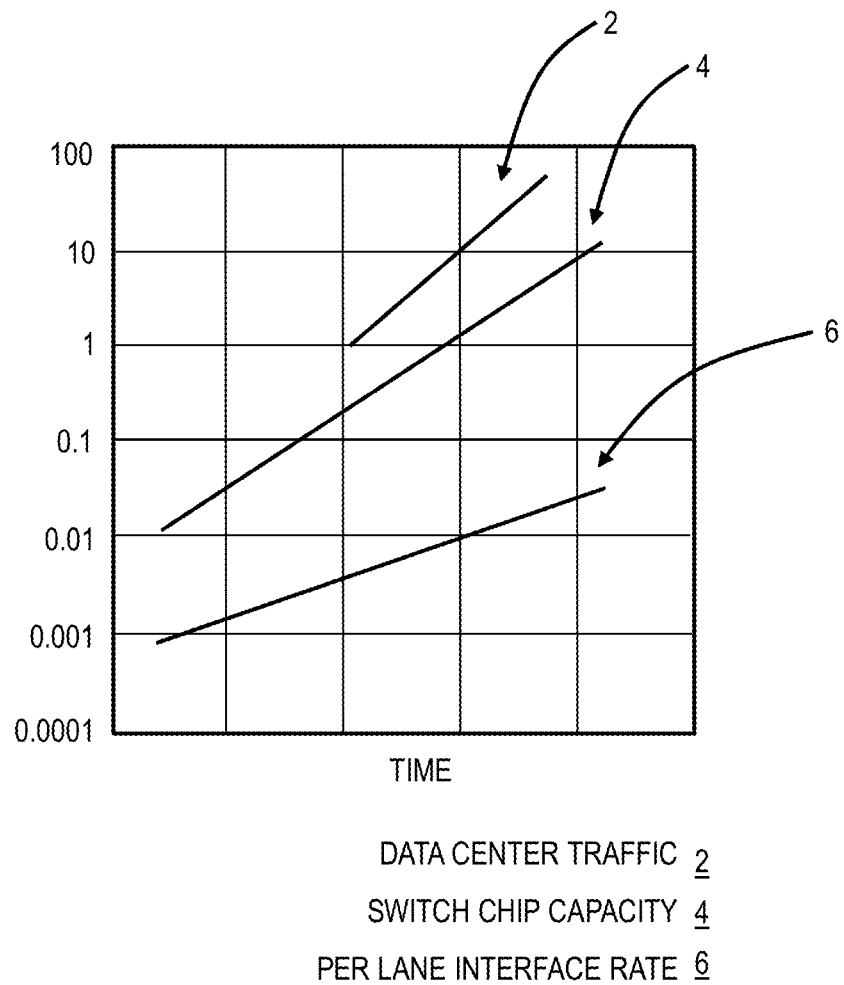
FIG. 1 is a graph of the capacity and expected growth over time for data center traffic, switch chip capacity, and per-lane interface rates for switch chips.
Figure 2:
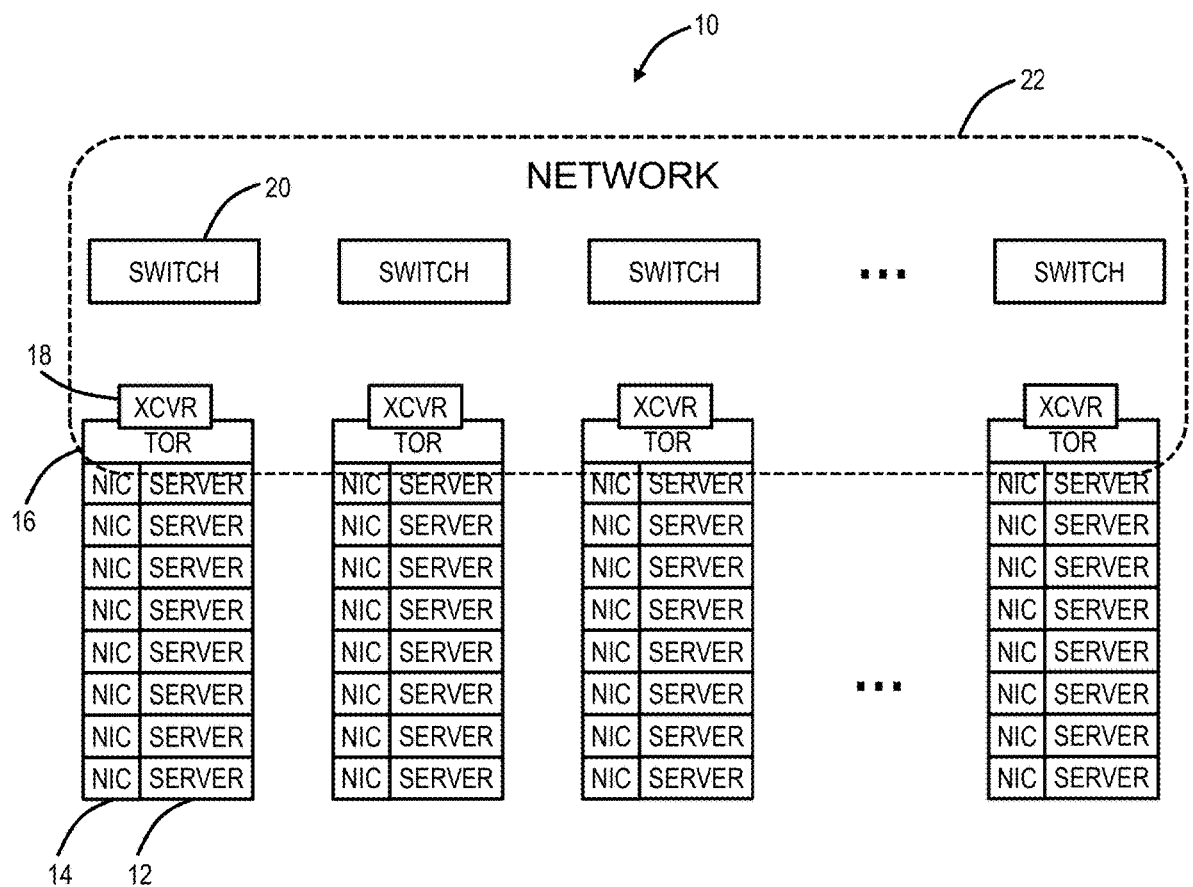
FIG. 2 is a diagram of an example data center network.

FIG. 2 is a diagram of an example data center network 10. The data center network 10 is configured to interconnect a plurality of servers 12 to one another. The servers 12 are processing devices configured to provide compute or storage resources, e.g., for cloud applications, for content distribution, etc. Each server 12 includes a Network Interface Card (NIC) 14 which is configured to provide packet connectivity to/from the server 12. In a typical data center implementation, the servers 12 are physically housed in a rack and each NIC 14 for the servers 12 in a corresponding rack connect to a Top of Rack (TOR) switch 16. That is, the TOR switch 16 may be physically at the top of the rack with the servers 12. Of course, other implementations are also contemplated. In the present disclosure, the TOR switch 16 is a switch configured to aggregate connections from the NICs 14 of multiple servers 12. The TOR switch 16 can include a transceiver (XCVR) 18 that connects to aggregation switches 20 together forming a network 22. The aggregation switches 20 are configured to interconnect the TOR switches 16, thereby enabling connectivity of the servers 12. The aggregation switches 20 may be referred to as End of Row (EOR) switches or the like. For example, the TOR switches 16 may be referred to as leaf switches, and the aggregation switches may be referred to as spine switches.

Those of ordinary skill in the art will recognize the data center network 10 is presented for illustration purposes, and the present disclosure contemplates any type of data center network. That is, the network 22 provides the interconnection between the switches 16, 20. Note, the network 22 is illustrated in FIG. 2 as a cloud to indicate the present disclosure contemplates any interconnection architecture for the switches 16, 20. Those skilled in the art will recognize there are various structured and unstructured interconnection architectures and the present disclosure contemplates operation on any such architecture where the packet forwarding is per-packet rather than per-flow. That is, the present disclosure assumes per-packet forwarding in the network 22 and an order recovery approach is presented in an edge switch in the data center network 10, such as the TOR switch 16 or even the NIC 14. As described herein, the edge switch is one before the destination, i.e., the server 12, and the approach described herein contemplates order recovery at this last switch so that the per-packet forwarding is transparent to the destination, i.e., the server 12. Further, this approach leverages programmability in programmable edge switches where it is more efficient to perform such order recovery, as opposed to the server 12 where it would consume valuable compute resources. Again, as described herein, the server 12 resources are what delivers value in the data center and it would not improve data center efficiency to offload order recovery to the compute or storage resources.

Some example switch interconnect topologies known in data center networks are Fat Tree (Clos), Dragonfly, Slim Fly, and B-Cube. Specifically, a Fat Tree or Clos network is frequently used in modern data centers, providing a structured network architecture that is easy to visualize, can be built from smaller building blocks, provides high bisectional bandwidth, etc. Further, the number of hops is at most 4 in a 3-layer network, traffic is easily routed with Equal-Cost Multi-Path routing (ECMP) and is resilient to failure, and network can be scaled further at the cost of additional layers. Another example of a data center network includes an unstructured network referred to as a structured rearranged network architecture (referred to as "STRAT") described in commonly-assigned U.S. patent application Ser. No. 16/239,917, filed Jan. 4, 2019, and entitled "Flat, highly connected optical network for data center switch connectivity," the contents of which are incorporated herein by reference.

Packet Versus Packet Flow Forwarding & Data Center Network Issues

In the data center network 10, packet flow (or flow, traffic flow, network flow, etc.) is a sequence of packets from a source to a destination. For example, a flow is also defined in RFC 3917 as "a set of Internet Protocol (IP) packets passing an observation point in the network during a certain time interval." As described herein, all packets in a specific flow take the same path in the data center network 10; thus, packet ordering is implicit and not an issue. That is, the source transmits the packets in sequence on the same path which does not change. As such, all packets arrive in sequence, regardless of possible path congestion or buffering. For example, a flow may include thousands of packets over a time interval. The first packet finds an open path and all the subsequent packets follow along the same path. However, the open path may have been a good choice for the first packet, but it may have become congested over time. There may be an improvement in network efficiency if subsequent packets took a different path, but this may lead to packet misordering at the destination.

Data center traffic loads are usually rapidly varying in source, destination, and volume. Today's high-performance servers and fast-access storage can support tens or even hundreds of applications that provide traffic into the network 10, and each server 12 may have hundreds of thousands of simultaneously open flows. Centralized load balancing schemes do not work well in data centers due to their reaction time being slower than typical traffic pattern and congestion hot spot variability. Centralized schemes are also quite limited in scale and cannot feasibly keep track of millions of possible flows in a typical large-scale data center. Distributed approaches overcome the scalability issue but may also be unable to distribute congestion information fast enough for the proper reaction. Further, some flow-oriented approaches are known to be prone to oscillations as multiple flows react simultaneously to congestion and get redirected to a known uncongested link, which then itself becomes congested. Again, per-packet load balancing performs much better than flow-oriented. However, it introduces some amount of packet misordering, which causes a problem for reliable transport protocols such as TCP.

Conventional attempts to correct packet order have been made within the traditional TCP stack, which is typically implemented inside the Operating System (OS) Kernel. This processing consumes substantial processing resources, to the detriment of actual CPU workload processing. Another more recent approach is Quick User Datagram Protocol (UDP) Internet Connections (QUIC) since adopted by IETF for standardization encrypts sequence numbers and relies on UDP transport protocol, which does not guarantee packet order. QUIC is implemented at the application layer, and packet order is maintained there, not in a programmable switch, again consuming valuable CPU resources.

Data center network load balancing is required to achieve both high throughput and low flow completion time. This has been a vexing problem, with many proposed algorithms. A recent survey in J. Zhang, F. R. Yu, S. Wang, T. Huang, Z. Liu and Y. Liu "Load balancing in data center networks: a survey," IEEE Comm. Surveys & Tutorials, vol. 20, no. 3, 2018, p. 2324, hereinafter referred to as Zhang and the contents of which are incorporated herein by reference, describes the state of the art in great detail. Zhang includes several tables. Table V in Zhang summarizes distributed schemes implemented with congestion awareness. The schemes rely on various techniques of measuring congestion along the flow path and taking some action to avoid congested paths. In general, such schemes perform well when traffic patterns and levels of congestion are stable on the time scale of measurement and action. But even in this case, schemes can be prone to oscillations as multiple flows can be redirected in a similar fashion to a path flagged as uncongested. Similarly, Table VI in Zhang summarizes distributed schemes that are generally congestion agnostic, although DRILL does use local queue information to make path selection decisions. Finally, Table VII in Zhang summarizes the performance of various schemes.

The present disclosure focuses on solving the packet reordering issue of schemes such as RPS, DRILL, and STRAT. However, the approach described herein can be applied to any architecture where packets are forwarded on a per-packet basis instead of a per-flow basis. That is, the present disclosure assumes packets are forward per-packet and not per-flow, the former being more efficient, and the present disclosure presents an order recovery approach in an edge switch so that the underlying server is unaware of this non-flow based forwarding. This approach is advantageous in any data center network architecture but is especially advantageous in unstructured architectures where misordering is greater than in structured architectures. That is, structured architectures with per-packet forwarding still mostly see packets traverse similar length paths based on ECMP, etc. In unstructured architectures, the paths can be much more diverse, leading to more misordering.

Some examples of data center packet forwarding and architectures include DRILL, RPS, STRAT, Clos, etc. DRILL is described in Ghorbani, S., Yang, Z., Godfrey, B., Ganjali, Y., & Firoozshahian, A. (2017). DRILL: Micro Load Balancing for Low-latency Data Center Networks. SIGCOMM, hereinafter referred to as Ghorbani and the contents of which are incorporated herein by reference. RPS, or Random Packet Spraying, is described in Dixit, A., Prakash, P., Hu, Y. C., & Kompella, R. R. (2013, April), On the impact of packet spraying in data center networks, In 2013 Proceedings IEEE INFOCOM (pp. 2130-2138), IEEE, the contents of which are incorporated herein by reference.

Packet Misordering in Per-Packet Forwarding

Figure 3:
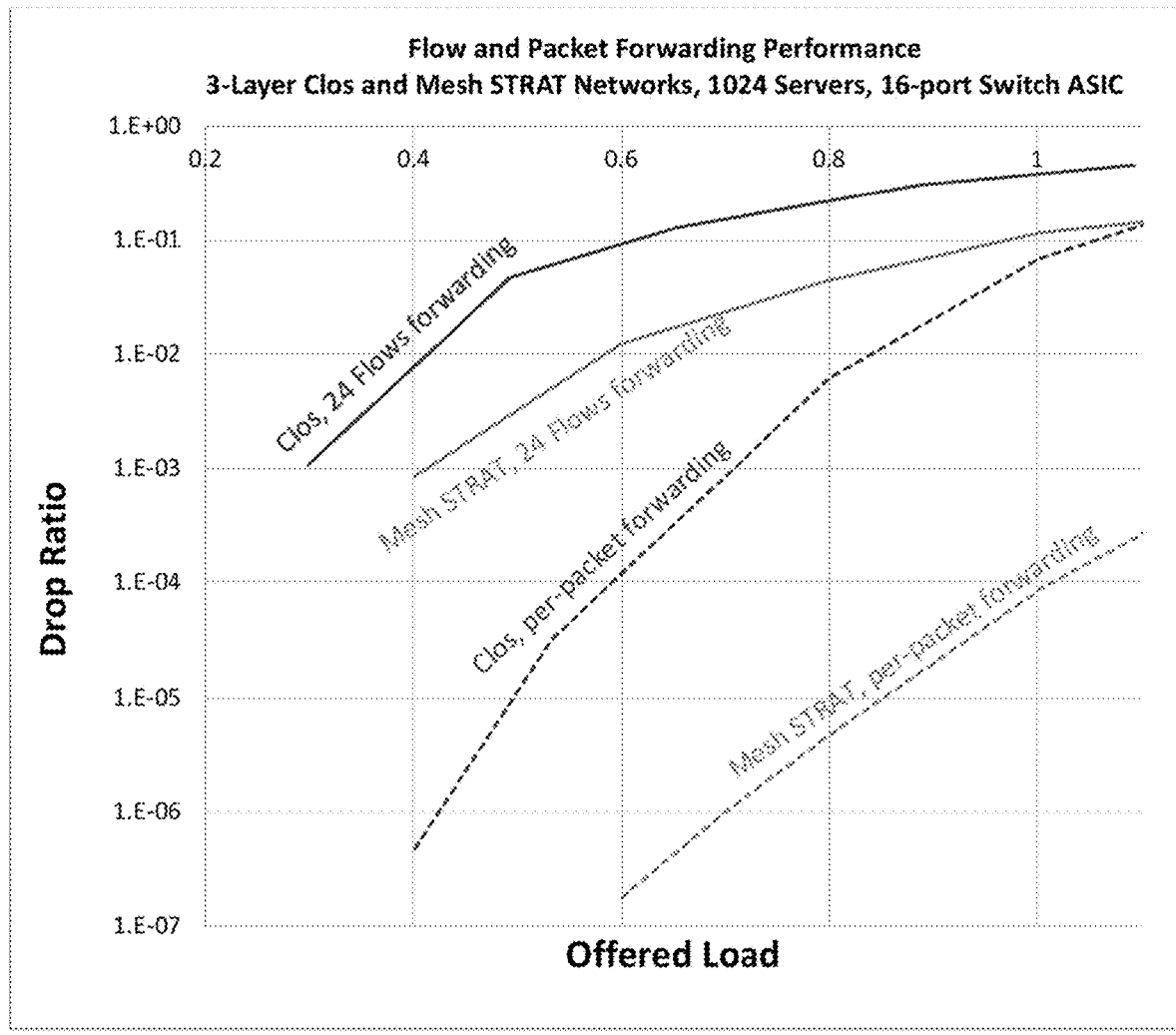
FIG. 3 is a graph of a drop ratio versus offered load for two simulated networks, Clos and mesh STRAT.

Again, the present disclosure contemplates a per-packet forwarding paradigm as opposed to a per-flow forwarding paradigm in the data center network 10. The following quantifies packet misordering in some example scenarios. For illustration purposes, simulations are presented on two types of networks, namely a 3-layer Clos (structured network) and a flat mesh STRAT (unstructured network). In these simulations, each network has 1024 servers attached and uses 16-port switch ASICs to implement the interconnecting network. FIG. 3 is a graph of a drop ratio versus offered load for the two simulated networks, Clos and mesh STRAT. Various different traffic patterns were investigated, and only random any-any traffic pattern results are presented in FIG. 3 for clarity (other traffic patterns, not illustrated, showed comparable trends).

FIG. 3 includes lines for per-packet forwarding (dashed lines) and flows forwarding (solid lines). Note that per-packet forwarding shows much better throughput compared to flows forwarding regardless of network topology. Further, note that mesh STRAT topology which uses k unequal path forwarding shows much better performance compared to a more structured 3-layer Clos which uses ECMP forwarding.

Figure 4:
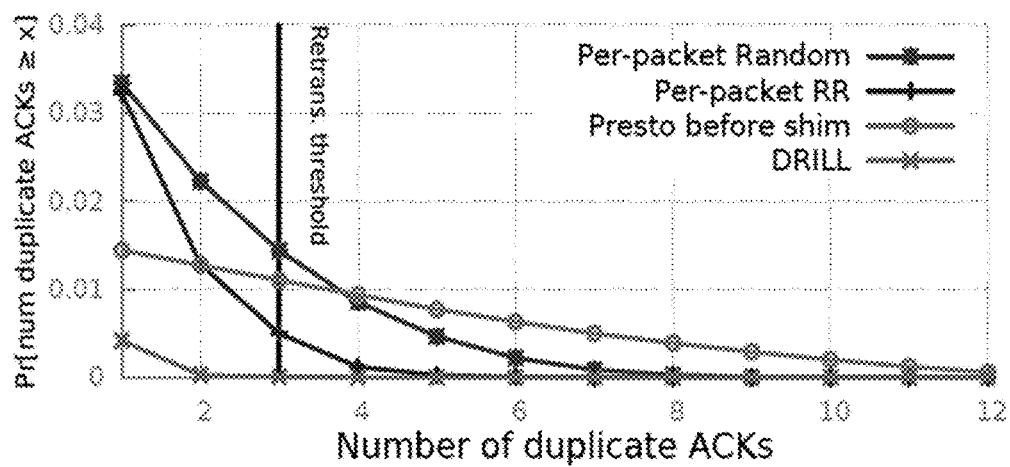
FIG. 4 is a graph of a Clos network under a 0.8 offered load to illustrate duplicate acknowledgements (ACKs)

Expected levels of packet misordering were also investigated. First, it is noted that flow forwarding has zero misordered packets by definition, i.e., all packets in a flow follow the same path. Second, misordering in ECMP used in 3-level Clos with per-packet forwarding is measurable, but small since all paths are equal hops. This performance is investigated in detail in Ghorbani and shows very small misordering as measured under 0.8 offered load, as shown for the DRILL algorithm in FIG. 4 which is applied to a Clos network under a 0.8 offered load to illustrate duplicate acknowledgements (ACKs). Duplicate ACKs indicate misordered packets.

Figure 5:
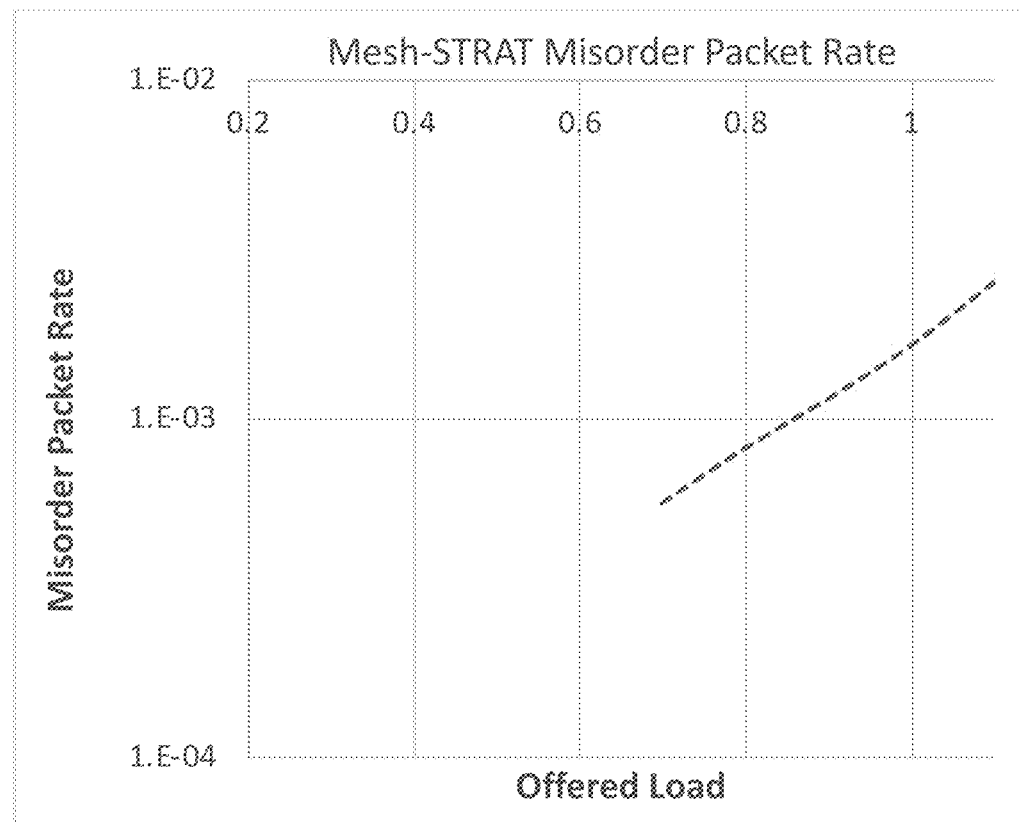
FIG. 5 is a graph of packet misordering rate in an unstructured network (mesh STRAT) with per-packet forwarding.

The best performing network topology is based on a Mesh-STRAT configuration, which uses k shortest Unequal Cost Multi-Path forwarding (UCMP). Given 'Unequal' paths, worst-case packet misordering is expected to be experienced in this type of network. Indeed, this is what is observed, as shown in FIG. 5 which is a graph of packet misordering rate in an unstructured network with per-packet forwarding. However, even in this network under extremely heavy load around Offered Load=1, misorder rate is below 0.002 with the modeled configuration (i.e. only 2 out of 1000 packets arrive out of expected order).

TCP

The present disclosure is described with reference to TCP for illustration purposes. However, the packet order recovery approach is fundamentally independent of the overlay transport protocol so long as a sequence number can be extracted from packet headers. Thus, other transport protocols are also contemplated. Also, specific protocols can be identified from the packet header.

Programmable Switch

Referring back to FIG. 2, the switches 20 can perform per-packet forwarding, with ECMP or k-shortest UCMP, to provide the best network performance, but with the disadvantage of packet misordering. The present disclosure contemplates restoring packet order at the TOR switch 16 or the NIC 14. The NIC 14 and/or the TOR switch 16 can include a programmable switch. Note, a new generation of ASIC switches (and FPGAs) affords a programmable infrastructure for implementing novel in-switch functions. An example of such a programmable infrastructure is specified in Portable Switch Architecture (PSA) and P4 programming language, each described in P416 Portable Switch Architecture (PSA), Version 1.1., Nov. 22, 2018, available online at p4.org/p4-spec/docs/PSA-v1.1.0.html, the contents of which are incorporated herein by reference.

Further, although there may be millions of concurrent flows being active at a particular time at a switch port, it is only necessary to keep the state of only a very small subset. For example, let's assume a fairly long-time window of 1 ms for state refresh. Assuming a 25 Gbps switch port rate and 1500 Byte Ethernet frames, only ~2000 unique flows may be present within the refresh time window even if it is assumed every single frame comes from a unique flow. In reality, frames come from repeating flows, and it is rare to observe a need to keep more than ~200 flow states at the local port table.

Packet Order Recovery

The present disclosure includes a packet order recovery process performed at a network edge switch in the data center network 10, before sending a packet to the server 12. The network edge switch can include the TOR switch 16 as well as possibly the NIC 14. The packet order recovery process is described in FIG. 6, which is a flowchart of a packet state maintenance process 50 for use in a per-packet forwarding-based data center network, and FIG. 7, which is a flowchart of a packet dequeuing process 70 for use with the packet state maintenance process 50 to provide packets in order to the server 12.

The packet order recovery process includes maintaining a state table tracking packet ingress and dequeuing packets based on the state table. That is, the packet order recovery process, in the edge switch, maintains flow and packet state, dequeues packets to egress when correct order is detected, recirculates of headers for repeated processing (for out of order), and controls the extent of the stored state through timers and entry counters.

Figure 6:
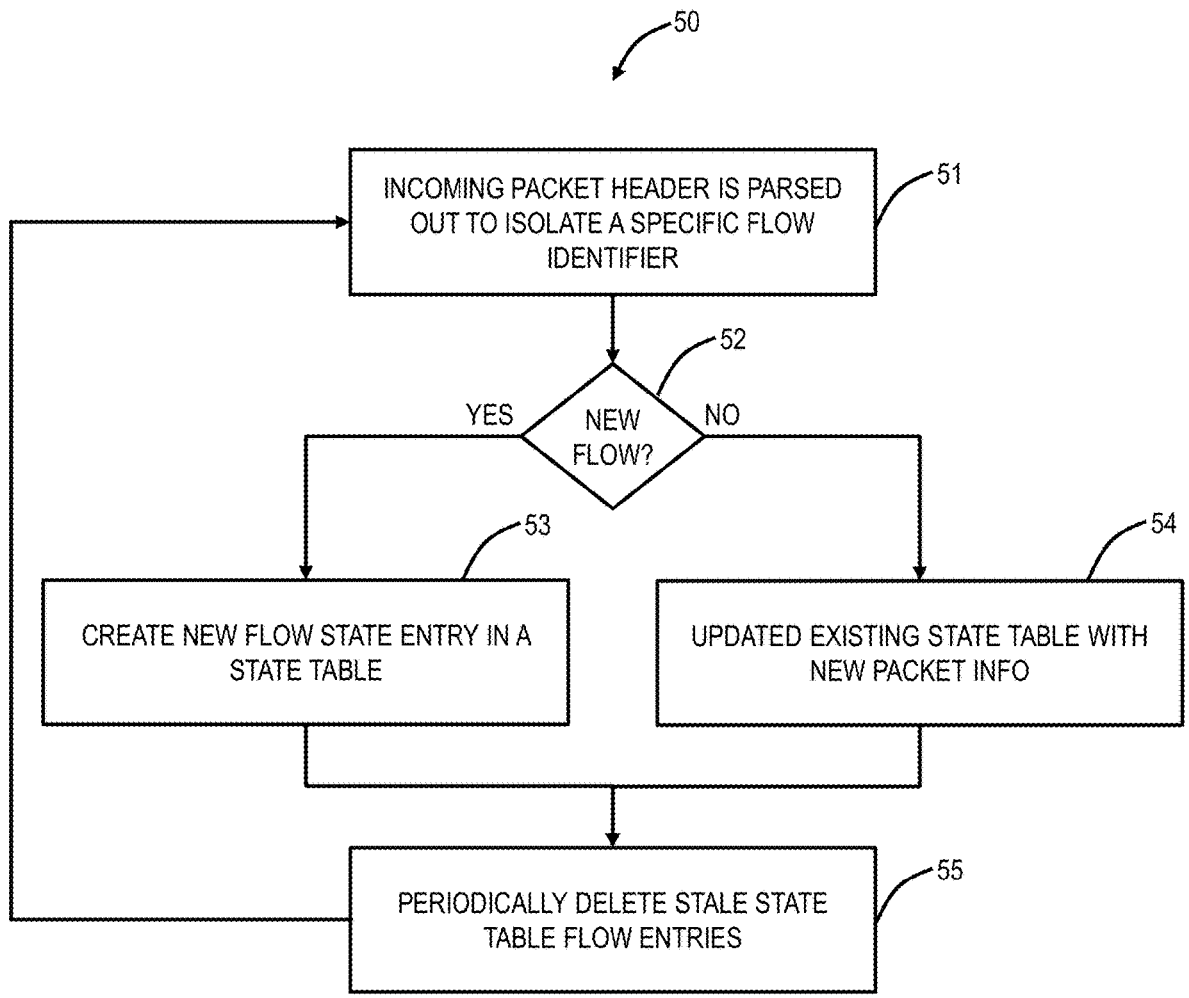
FIG. 6 is a flowchart of a packet state maintenance process for use in a per-packet forwarding-based data center network.
Figure 7:
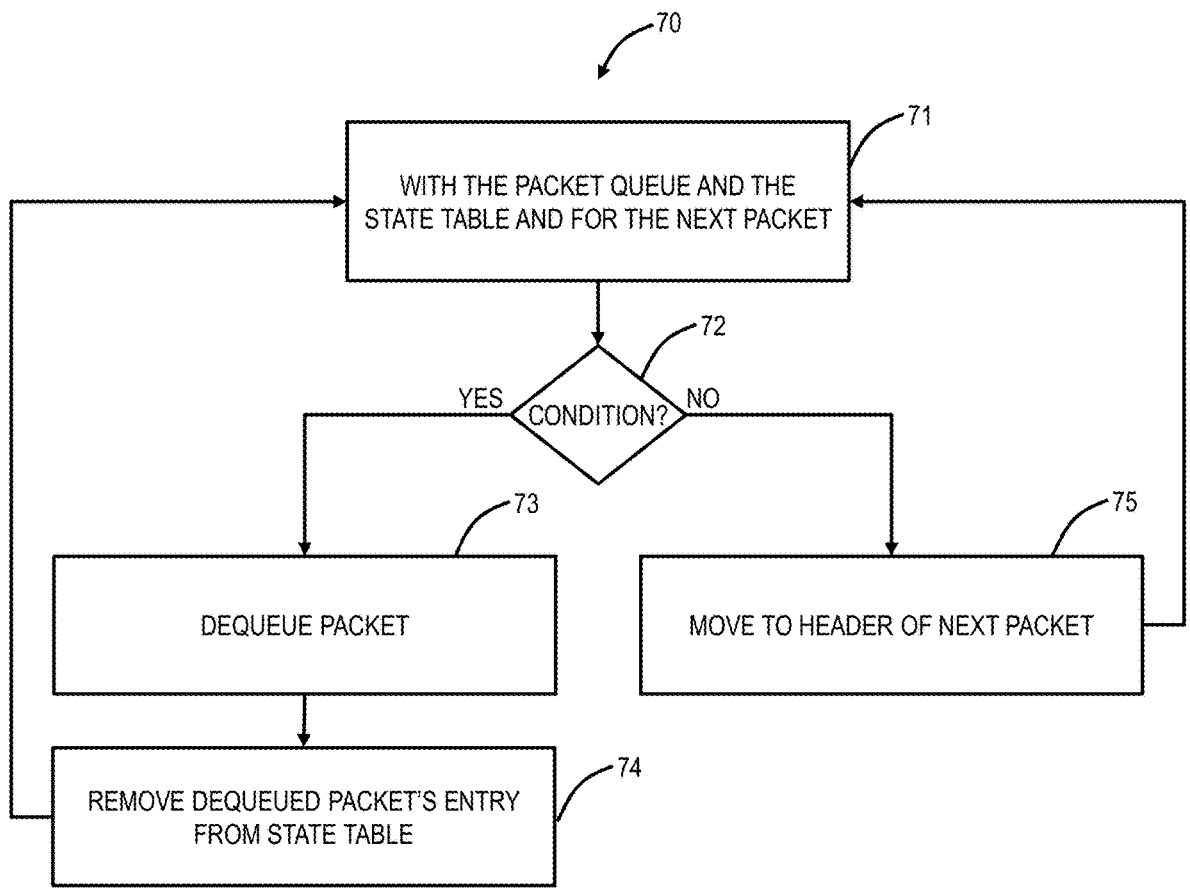
FIG. 7 is a flowchart of a packet dequeuing process for use with the packet state maintenance process of FIG. 6 to provide packets in order to a server.

The packet state maintenance process 50 is performed as packets are received by the edge switch, i.e., the TOR switch 16 or the NIC 14, and the packet dequeuing process 70 is performed as packets are transmitted to the server 12. In FIG. 6, an incoming packet header is parsed out to isolate a specific flow identifier (step 51). For example, this can include a standard 5-tuple of a source address, source port, destination address, destination port, and IP protocol (TCP or UDP). Also, this can include parsing out a TCP sequence number. From this data, e.g., the 5-tuple and the TCP sequence number, it is possible to identify a flow and identify a location of the packet in the flow.

If the flow is new (step 52), the packet state maintenance process 50 includes creating a new flow state entry in the state table (step 53). In an embodiment, the state table can be managed in registers in a programmable switch utilizing P4, such as described in p4.org/p4-spec/docs/PSA-v1.1.0.html#sec-registers. If the flow is an existing flow (step 52), the packet state maintenance process 50 includes updating the existing state table with the new packet info (step 54). Further, the packet state maintenance process 50 can include periodically (e.g., 1 ms or so) deleting stale flow table entries to free up space. A stale entry can be defined as one for a flow that has not seen a new packet in a configurable time period.

The packet dequeuing process 70 is performed as packets are transmitted to the server 12 and relies on a packet queue in the edge switch and the state table. The packet queue is a memory or buffers in the edge switch (e.g., the TOR switch 16 or the NIC 14) where the incoming packets are stored. The packet queue can be separate memory from where the state table is stored and maintained (e.g., the registers in P4). Because of the per-packet forwarding, packets may be misordered when received (per the packet state maintenance process 50). The objective of the packet dequeuing process 70 is to ensure packets in a flow are transmitted to the server 12 in order.

With the next packet for a flow (step 71), the packet dequeuing process 70 includes checking if a packet dequeuing condition is met (step 72). Specifically, the packets are stored in the packet queue and read out (dequeued) based on the packet dequeuing conditions. In an embodiment, the packet dequeuing conditions include any or all of If the packet satisfies next expected sequence number, i.e., the order is restored/maintained, that is this is the next packet to transmit to the server 12;

If the packet has a much smaller sequence number than expected sequence number, i.e., this packet is likely retransmitted;

If the state table is getting overfilled for a particular flow; or

If the state table entry is stale, i.e., packet hold latency is exceeding allowed limit.

If the next packet satisfies a packet dequeuing condition (step 72), the packet is dequeued/transmitted to the server 12 (step 73), and the dequeued packet's entry is removed from the state table (step 74).

If the next packet does not match a packet dequeuing condition (step 72), the packet dequeuing process 70 does not dequeue this packet for the flow (step 75), but rather maintains the payload in the packet queue and recirculates the header back for processing (at step 71). For example, the header is recirculated such that the packet dequeuing process 70 dequeues this packet at the right point in the flow, i.e., sequence.

Referring back to FIG. 2, in an embodiment, the data center network includes a plurality of edge switches (e.g., the TOR switches 16) communicatively coupled to a plurality of servers 12; and a plurality of aggregation switches 20 communicatively coupled to the plurality of edge switches. Packets associated with flows in the data center network 10 are forwarded on a per-packet basis, and each of the plurality of edge switches is configured to maintain a state of each of the flows and of received incoming packets, and dequeue the received incoming packets based on one or more packet dequeue conditions and the state.

The one or more packet dequeue conditions include any of a packet satisfying a next expected sequence number, a packet having a much smaller sequence number than expected indicative of a retransmitted packet, memory storing the state is overfilled for a particular flow, and an entry for the state is stale.

Example Packet Order Recovery Operation

A specific example implementation was tested. This implementation investigated processing through a single packet pipeline, as parallel ones would be identical. The results showed no dropped packets, as load rate is kept below port throughput. The example implementation included incoming TCP packets queued for processing; packet headers parsed for both flow ID and TCP sequence number; the state table stored the following information for each non-stale flow: flow ID, expected next sequence number time stamp, count of flow packets in queue, a list of queued packet sequence numbers (~40 entries); and the state table was periodically cleaned from stale flow entries (e.g., at ~1 ms intervals). Packets were either dequeued to egress or recirculated according to above-specified conditions, i.e., the packet dequeuing conditions. Of course, other arrangements of counters, timers, and buffers are certainly possible and are considered to be within the scope of the present disclosure.

Figure 8:
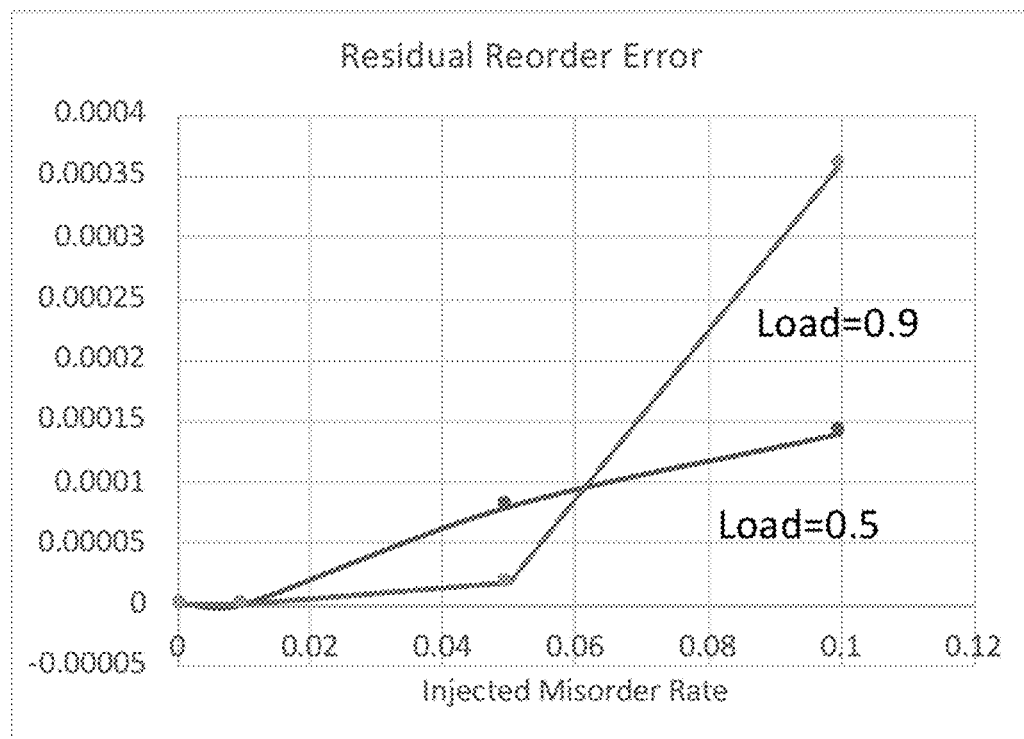
FIG. 8 are graphs summarizing simulation results for the example implementation of the packet order recovery process.
Figure 8:
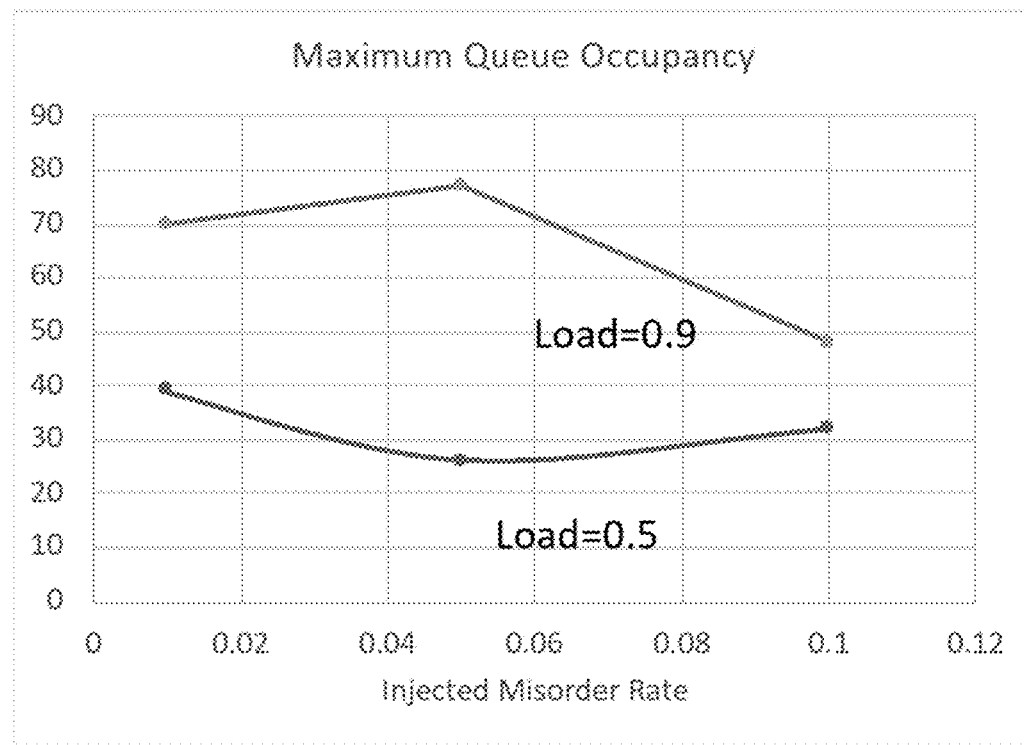

FIG. 8 are graphs summarizing simulation results for the example implementation of the packet order recovery process. As shown in FIG. 8, the packet order recovery process is able to completely recover misordered packets at misorder rates 0.01 and below. Only somewhat unrealistic misordering of 0.05 (i.e., 5%) and above produces some residual errors, but even those are very rare (i.e. reduced from 5% to below 0.01%). Typical recirculating header queue occupancy was quite low, well below 100 headers. The typical state table number of stored flow states was measured, and these are typically around ~100 for the simulated range of parameters, well within a realistic ASIC or FPGA capability. These numbers are independent of the total number of flows at a switch port, which could number in millions.

Process

Figure 9:
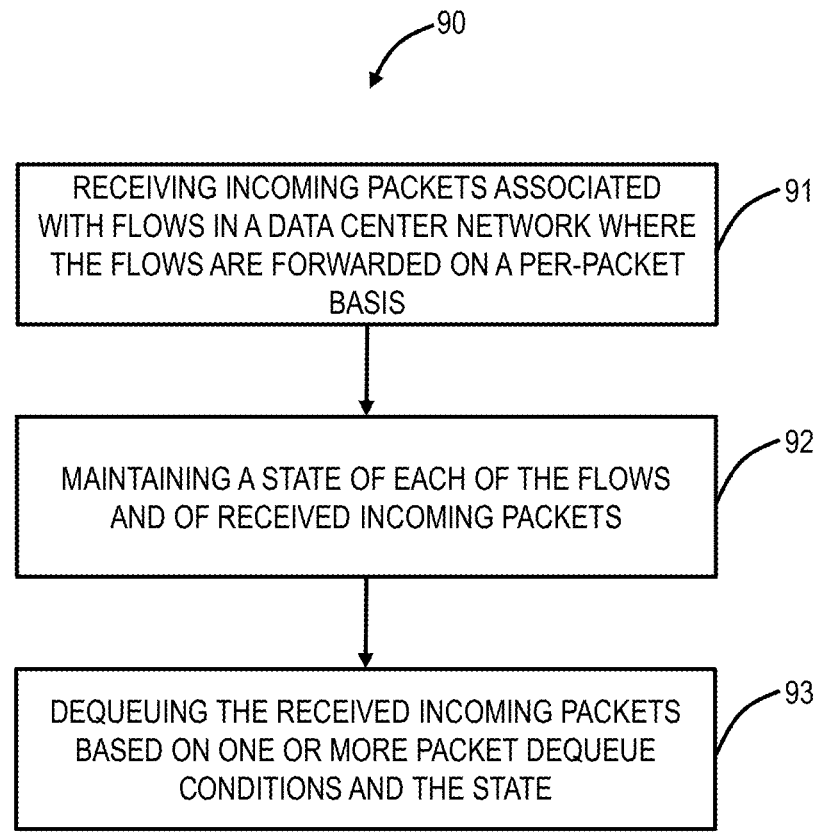
FIG. 9 is a flowchart of a process performed in an edge switch in a data center network, such as illustrated in FIG. 2.

FIG. 9 is a flowchart of a process 90 performed in an edge switch in a data center network 10. The process 90 can be implemented in the TOR switch 16 or one of the NICs 14 coupled to a server 12. Alternatively, the process 90 can be implemented in circuitry in the edge switch. The process 90 includes receiving incoming packets associated with flows in a data center network where the flows are forwarded on a per-packet basis (step 91); maintaining a state of each of the flows and of received incoming packets (step 92); and dequeuing the received incoming packets based on one or more packet dequeue conditions and the state (step 93).

The receiving incoming packets can include queueing the received incoming packets, and the maintaining can include maintaining an entry for each of the received incoming packets based on a flow identifier and a sequence number. The process 90 can further include processing headers of the received incoming packets in the queue, for the dequeuing. The state can be managed in memory in the edge switch, and the process 90 can further include deleting stale entries in the memory and entries that are dequeued.

The one or more packet dequeue conditions can include any of a packet satisfying a next expected sequence number, a packet having a much smaller sequence number than expected indicative of a retransmitted packet, memory storing the state is overfilled for a particular flow, and an entry for the state is stale. The received incoming packets can utilize a transport protocol including any of Transmission Control Protocol (TCP), Xpress Transport Protocol (XTP), and Stream Control Transmission Protocol (SCTP). For a particular flow, a first packet can take a different path in the data center network than a second packet such that the second packet is received out-of-order at the edge switch. Of course, the terminology "first" and "second" is used for a relative comparison of these two packets, in a flow, and not meant to indicate exact sequence, etc. That is, these just note that any given two packets in a flow may take different paths and be received out-of-order based thereon. For example, the second packet may be several packets after the first packet and the like.

The flows received by the edge switch are destined for a server 12 communicatively coupled to the edge switch. For example, the edge switch can be one of a Top of Rack switch and a Network Interface Card (NIC) communicatively coupled to a corresponding server 12. From the server's perspective, the transport protocol is maintained, even though the packets may be arriving at the edge switch out-of-order—this is corrected at the edge switch, transparent to the server 12.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An edge switch comprising:
one or more programmable Application Specific Integrated Circuits (ASICs) configured to implement programmable functions, wherein the one or more programmable ASICs include
circuitry configured to receive incoming packets associated with flows in a data center network where the flows are forwarded on a per-packet basis, wherein at a particular time at a particular switch port the flows include a number of active concurrent flows;
circuitry configured to maintain a state table that includes a state of the flows and of received incoming packets, wherein the state table includes a corresponding state for a subset of all flows through the edge switch and entries in the state table are only kept for a refresh time window that has a value where the number of active concurrent flows is orders of magnitude higher than a number of flows in the state table, and wherein the state table is stored in registers of the programmable ASICs and managed via the programmable functions; and
circuitry configured to dequeue the received incoming packets based on one or more packet dequeue conditions and the state table, including re-ordering of the received incoming packets in a correct order based on the state table such that the re-ordering is performed at the edge switch as opposed to a server, wherein the re-ordering comprises dequeuing a packet of the received incoming packets within the edge switch before being transmitted to the server when a sequence number of the packet indicates a correct order and, when the sequence number of the packet indicates an incorrect order, maintaining a payload of the packet and recirculating a header of the packet.

2. The edge switch of claim 1, wherein the circuitry configured to receive incoming packets is configured to queue the received incoming packets, and the circuitry configured to maintain the state table is configured to maintain an entry for each of the received incoming packets based on a flow identifier and a respective sequence number.

3. The edge switch of claim 2, further comprising
circuitry configured to process respective headers of the received incoming packets in the queue, for the circuitry configured to dequeue the received incoming packets.

4. The edge switch of claim 1, wherein the state table is managed in memory in the edge switch, and further comprising
circuitry configured to delete entries in the memory that are stale and that are dequeued.

5. The edge switch of claim 1, wherein the one or more packet dequeue conditions include any of
a packet satisfying a next expected sequence number,
a packet having a much smaller sequence number than expected indicative of a retransmitted packet,
memory storing the state table is overfilled for a particular flow, and
an entry for the state table is stale.

6. The edge switch of claim 1, wherein the edge switch is one of a Top of Rack switch and a Network Interface Card (NIC) communicatively coupled to a corresponding server.

7. The edge switch of claim 1, wherein the received incoming packets utilize a transport protocol including any of Transmission Control Protocol (TCP), Xpress Transport Protocol (XTP), and Stream Control Transmission Protocol (SCTP).

8. The edge switch of claim 1, wherein, for a particular flow, a first packet takes a different path in the data center network than a second packet such that the second packet is received out-of-order at the edge switch.

9. A method comprising:
in an edge switch with one or more programmable Application Specific Integrated Circuits (ASICs) configured to implement programmable functions, receiving incoming packets associated with flows in a data center network where the flows are forwarded on a per-packet basis, wherein at a particular time at a particular switch port the flows include a number of active concurrent flows;
maintaining a state table that includes a state of the flows and of received incoming packets, wherein the state table includes a corresponding state for a subset of all flows through the edge switch and entries in the state table are only kept for a refresh time window that has a value where the number of active concurrent flows is orders of magnitude higher than a number of flows in the state table, and wherein the state table is stored in registers of the programmable ASICs and managed via the programmable functions; and
dequeuing the received incoming packets based on one or more packet dequeue conditions and the state table, including re-ordering of the received incoming packets in a correct order based on the state table such that the re-ordering is performed at the edge switch as opposed to a server, wherein the re-ordering comprises dequeuing a packet of the received incoming packets within the edge switch before being transmitted to the server when a sequence number of the packet indicates a correct order and, when the sequence number of the packet indicates an incorrect order, maintaining a payload of the packet and recirculating a header of the packet.

10. The method of claim 9, wherein the receiving incoming packets includes queueing the received incoming packets, and the maintaining includes maintaining an entry for each of the received incoming packets based on a flow identifier and a respective sequence number.

11. The method of claim 10, further comprising
processing respective headers of the received incoming packets in the queue, for the dequeuing.

12. The method of claim 9, wherein the state table is managed in memory in the edge switch, and further comprising
deleting entries in the memory that are stale and for packets that are dequeued.

13. The method of claim 9, wherein the one or more packet dequeue conditions include any of
a packet satisfying a next expected sequence number,
a packet having a much smaller sequence number than expected indicative of a retransmitted packet,
memory storing the state table is overfilled for a particular flow, and
an entry for the state table is stale.

14. The method of claim 9, wherein the method is implemented in an edge switch that is one of a Top of Rack switch and a Network Interface Card (NIC) communicatively coupled to a corresponding server.

15. The method of claim 9, wherein the received incoming packets utilize a transport protocol including any of Transmission Control Protocol (TCP), Xpress Transport Protocol (XTP), and Stream Control Transmission Protocol (SCTP).

16. The method of claim 9, wherein, for a particular flow, a first packet takes a different path in the data center network than a second packet such that the second packet is received out-of-order at the edge switch.

17. A data center network comprising:
a plurality of switches communicatively coupled to a plurality of servers,
wherein packets associated with flows in the data center network are forwarded on a per-packet basis, wherein at a particular time at a particular switch port the flows include a number of active concurrent flows;, and
wherein each of the plurality of switches include one or more programmable Application Specific Integrated Circuits (ASICs) configured to implement programmable functions, wherein the one or more programmable ASICs include are configured to
maintain a state table that includes a state of the flows and of received incoming packets, wherein the state table includes a corresponding state for a subset of all flows through a particular edge switch of the plurality of switches and entries in the state table are only kept for a refresh time window that has a value where the number of active concurrent flows is orders of magnitude higher than a number of flows in the state table, and wherein the state table is stored in registers of the programmable ASICs and managed via the programmable functions, and
dequeue the received incoming packets based on one or more packet dequeue conditions and the state table, including re-ordering of the received incoming packets in a correct order based on the state table such that the re-ordering is performed at the particular edge switch as opposed to a server, wherein the re-ordering comprises dequeuing a packet of the received incoming packets within the particular edge switch before being transmitted to the server when a sequence number of the packet indicates a correct order and, when the sequence number of the packet indicates an incorrect order, maintaining a payload of the packet and recirculating a header of the packet.

18. The data center network of claim 17, wherein the one or more packet dequeue conditions include any of
a packet satisfying a next expected sequence number,
a packet having a much smaller sequence number than expected indicative of a retransmitted packet,
memory storing the state table is overfilled for a particular flow, and
an entry for the state table is stale.

19. The data center network of claim 17, wherein the plurality of switches are one of a Top of Rack switch and a Network Interface Card (NIC) communicatively coupled to a corresponding server.

20. The data center network of claim 17, wherein the received incoming packets utilize a transport protocol including any of Transmission Control Protocol (TCP), Xpress Transport Protocol (XTP), and Stream Control Transmission Protocol (SCTP).

* * * * *